Dec. 1, 1953     C. J. FORSCHNER     2,660,948
COFFEE MAKER
Filed Oct. 16, 1947     3 Sheets-Sheet 1
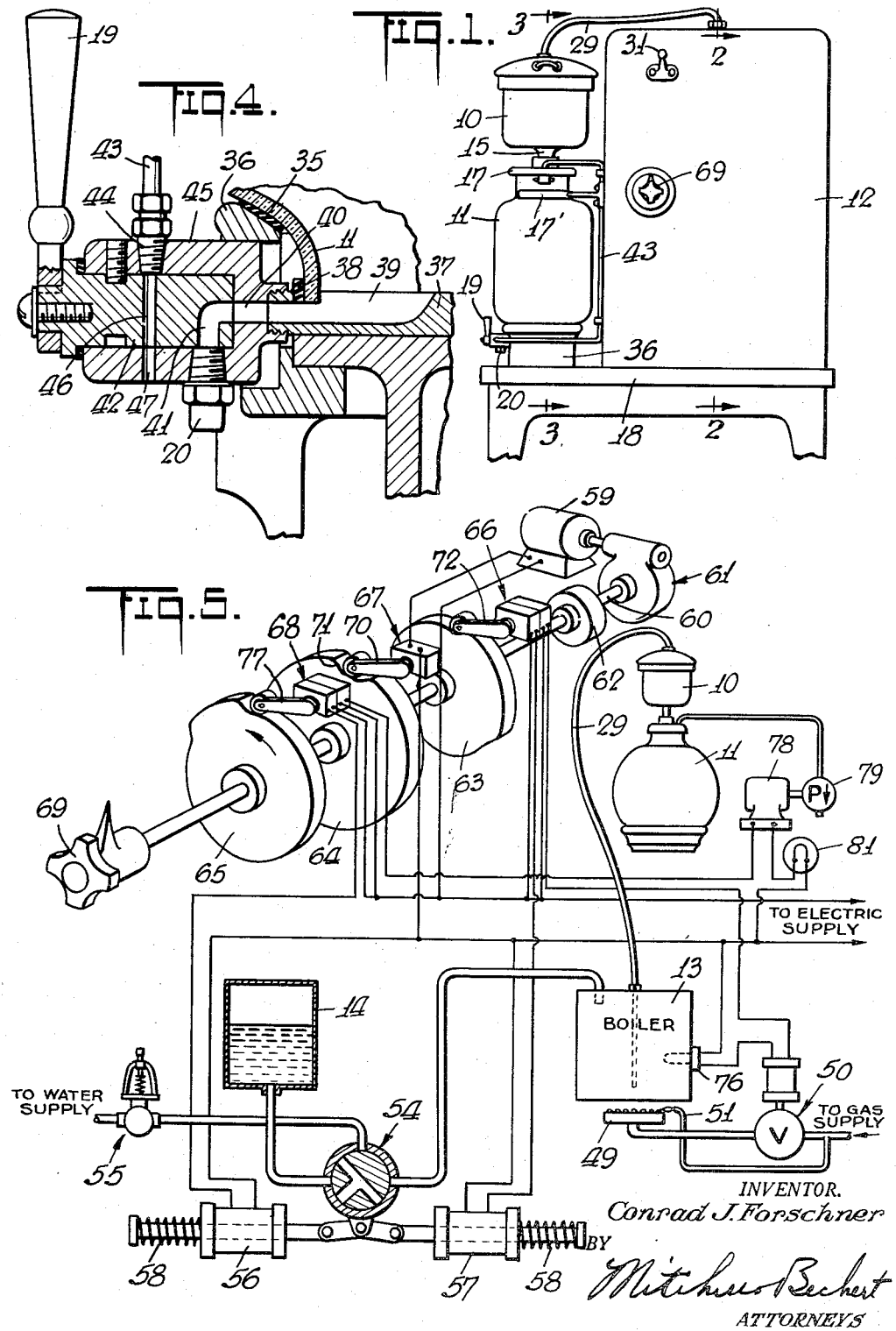
INVENTOR.
Conrad J. Forschner
BY Mitchell Bechert
ATTORNEYS

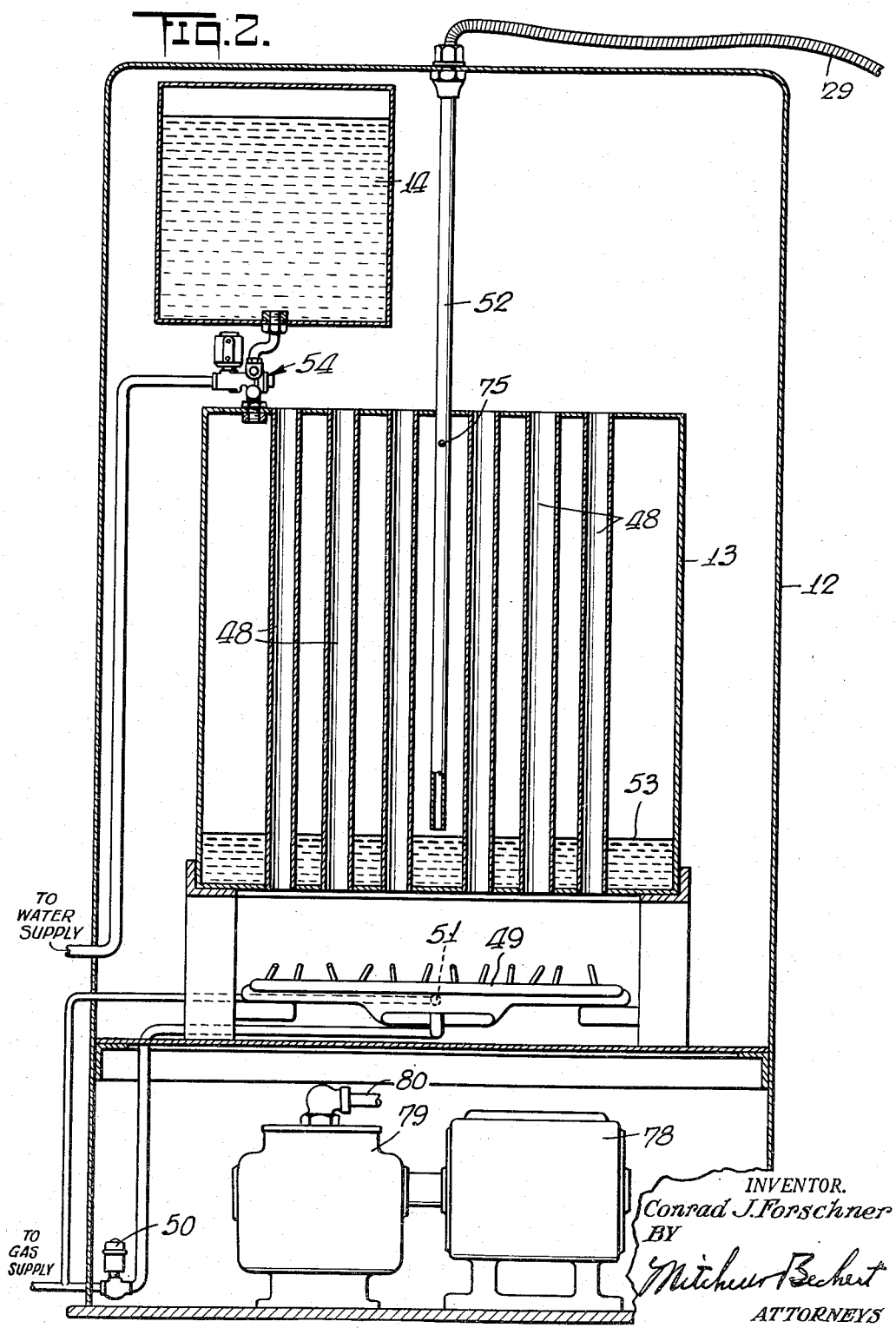

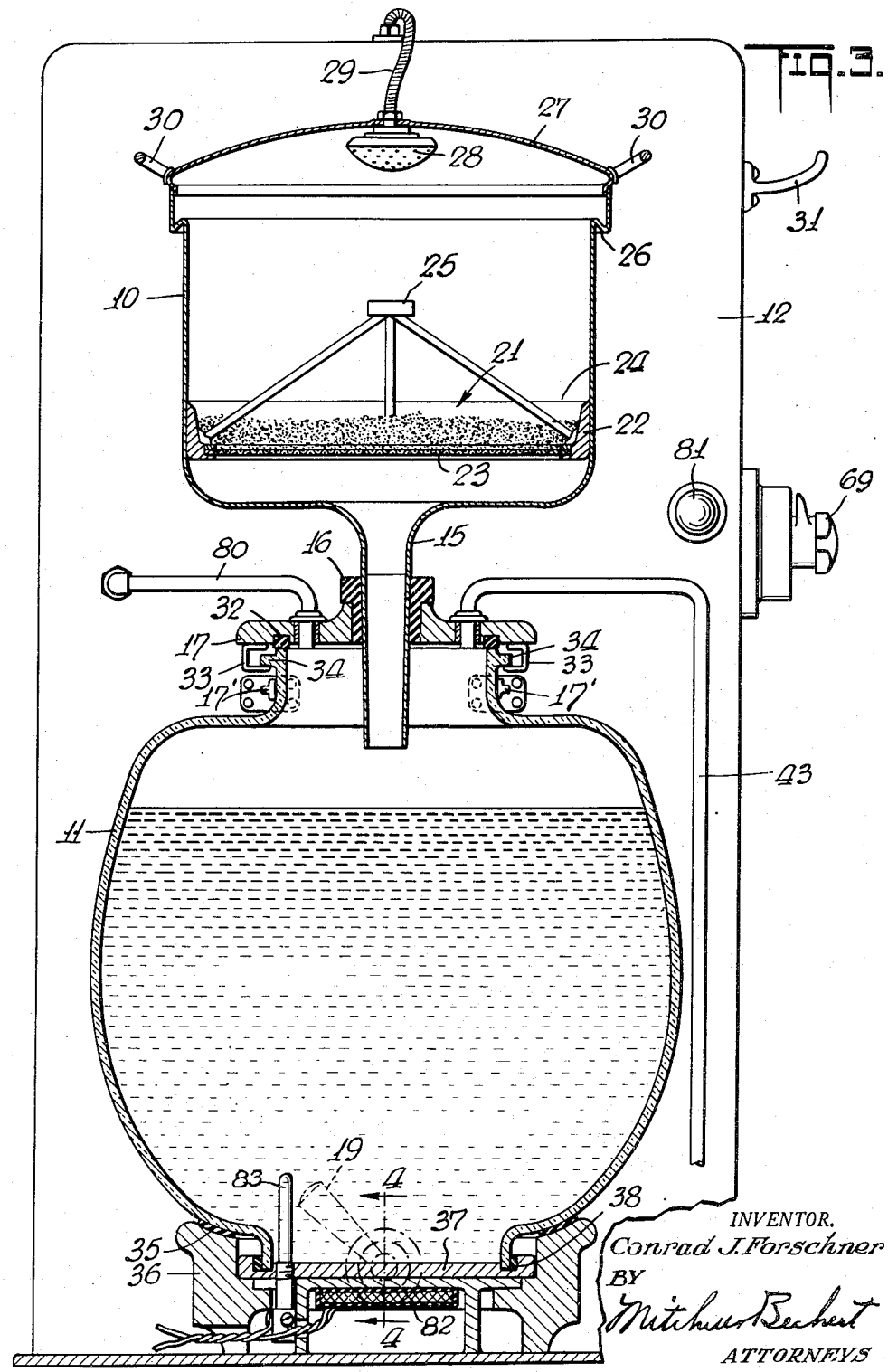

Patented Dec. 1, 1953

2,660,948

UNITED STATES PATENT OFFICE 2,660,948

COFFEE MAKER

Conrad J. Forschner, New York, N. Y.

Application October 16, 1947, Serial No. 780,187

5 Claims. (Cl. 99—282)

My invention relates to an automatic coffee-making machine. Since the equipment to be discussed is as applicable to the brewing of tea and other beverages as it is to coffee-making, the consistent reference to coffee-making herein will be understood to include the brewing of other beverages, including tea.

In restaurants, lunch counters, and the like, where coffee must be brewed in quantities and where the person responsible for brewing the coffee can devote only a relatively small fraction of his time and attention to brewing the coffee, it is virtually impossible for such person to brew the coffee uniformly, from batch to batch. Quality and taste of the brewed coffee therefore suffer, to the impairment of the customer's satisfaction.

It is, accordingly, an object of my invention to provide an improved coffee-making apparatus, particularly for the application indicated.

It is another object to provide a coffee-making apparatus that will assure a uniformly brewed product, from batch to successive batch.

It is also an object to provide a more completely automatic coffee-making apparatus which will require no more attention of the person responsible for brewing the coffee than that he initiate the automatic process.

It is a general object to achieve the above objects with an inherently simple apparatus that is not likely to get out of order and that will be easy to clean and service.

Other objects and various further features of the invention will be pointed out or will occur to those skilled in the art from a reading of the following specification in conjunction with the accompanying drawings. In said drawings, which show for illustrative purposes only, a preferred form of the invention:

Fig. 1 is a side view of a fully assembled automatic coffee maker incorporating features of the invention;

Figure 2 is an enlarged sectional view taken substantially in the plane 2—2 of Fig. 1;

Fig. 3 is another enlarged sectional view taken substantially in the plane 3—3 of Fig. 1;

Fig. 4 is an enlarged fragmentary sectional view taken substantially in the plane 4—4 of Fig. 3; and Fig. 5 is a more or less schematic view illustrating the cooperative relationship of elements in the coffee maker of Fig. 1.

Briefly stated, my invention contemplates automatic control means for a coffee or other beverage maker of the type wherein hot water of a prescribed elevated temperature is mixed only once with the coffee or other beverage grounds (or leaves, or other dried preparation from which the beverage essence is to be brewed or extracted) in a suitable receptacle, which, for purposes of present description will be called a coffee-ground receptacle, and in which it is thereupon delivered to a brewed-coffee receptacle. The control means includes a timer for properly coordinating the measuring of water to be admitted to a boiler, the admission of the measured water to the boiler, the supply of heat to the boiler, and the enforced (as by means of a pressure differential) straining of brewed coffee from the ground-coffee receptacle to the brewed-coffee receptacle. As indicated above, the present equipment is applicable to the brewing of tea and other beverages, so that the specific references to coffee-making will not be understood as limiting the usefulness of the apparatus.

In the form to be described, timing is controlled by a system of motor-driven cams which are ganged and which complete a full single revolution for one cycle of brewing. This cycle may require an elapsed time of the order of three minutes. First cam-operated switch means operates a valve to dump measured water (measured during the previous brewing cycle) from the measuring tank into the boiler, more or less concurrently with operation of another valve to supply heat to the boiler. Upon the attainment of sufficient pressure in the boiler, the measured quantity of then-heated water is conducted to the ground-coffee receptacle. After a delay period during which brewing takes place, second cam-operated switch means starts a vacuum pump to produce a partial vacuum within the brewed-coffee receptacle, so that there may be a pressure differential across the pile of coffee grounds to enforce a quick complete extraction of the brewed coffee. The second switch means may also control a valve to admit water in a measured quantity into the measuring tank, for use during the next brewing cycle.

Referring to the drawings, my invention is shown in application to a coffee-making machine comprising a ground-coffee receptacle 10, a brewed-coffee receptacle 11, and a housing 12. The housing 12 may accommodate automatic elements including a water heater or boiler 13 and a water-measuring tank 14. The ground-coffee receptacle 10 includes a tail pipe 15 to be removably inserted in a rubber-like grommet or washer 16 in a cap piece or top 17 covering the brewed-coffee receptacle 11. The tail pipe 15 thus serves for the support of the ground-coffee receptacle and for the conduction of brewed coffee from the brewing chamber in receptacle 10 down into the brewed-coffee receptacle 11. The two receptacles 10—11 may be supported generally forward of the housing 12 on a bench or table 18, and held in place by resilient holding brackets 17' engaging the neck of receptacle 11. Convenient access may thus be had to a spigot handle 19 for drawing off brewed coffee at the spout 20, as may be required.

In the form shown, the ground-coffee receptacle 10 comprises a body of preferably substantially constant cross-section, as provided by a cylindrical wall. A ground-coffee retainer 21 is slidably insertable in the body of receptacle 10, preferably with a close fit. In the form shown, the retainer 21 comprises an annular rim piece 22 recessed to hold a filter 23, which may be of woven metal-fiber construction. The upper edge of the retainer rim 22 may be conically dished so as to provide a relatively sharp edge 24 for scraping contact with the wall of receptacle 10, as when the retainer 21 is withdrawn by lifting the handle 25. The upper end of the receptacle 10 preferably includes an annular gutter 26 to catch such coffee grounds as may not be scraped by edge 24 into the retainer 21 upon withdrawing the same. Thus, the gutter 26 may prevent inadvertent discharge of coffee grounds into the brewed coffee receptacle 11. The ground-coffee receptacle 10 is shown to include a cover 27 to which a spray nozzle 28 is secured. The nozzle is preferably so arranged that at least some of its jets may impinge upon the gutter 26 and thus flush the gutter each time the spray 28 is operated. The spray 28 is shown connected to the hot-water supply system within the housing 12 by means of a flexible connecting hose 29. When replacing the coffee-ground retainer 22, the cover 27 may be hung on the side of the housing 12 by resting one of the handles 30 on a suitable hook 31, as will be clear.

As indicated generally above, my preferred brewed-coffee receptacle 11 includes spigot means 19—20 for dispensing brewed coffee without inverting the receptacle 11, and without requiring removal of the ground-coffee receptacle 10. In the form shown, the receptacle 11 is of glass and open at both upper and lower ends. At the upper end, it may be sealed by means of a resilient ring or washer 32 to the cover member 17, and bayonet clips 33 may engage lugs 34 to secure the cover 17 on receptacle 11. The lower end of the receptacle 11 is shown to be supported by an annular cushion 35 on a pedestal 36; the lower rim of the receptacle 11 projects into an annular groove in a bottom plate 37 carried by the pedestal 36, and an annular washer 38 in the same groove serves to effect a seal between the receptacle 11 and the bottom plate 37, as will be clear.

In the form shown, an open generally radially directed trough 39 in the bottom plate 37 serves to conduct brewed coffee to the passage 40 in the spigot; and when the spigot is in the position shown in Fig. 4, the passage 41 in the movable spigot block 42 is positioned to pass brewed coffee via passages 39—40—41 to the outlet or spout 20. In order that the draining of coffee via the outlet passages described may not create a partial vacuum over the brewed coffee in receptacle 11, I have provided a venting system to become operative as the spigot handle 19 is operated. In the venting system, a vent pipe 43 may be removably held in the cover 17 at one end, and it may be fitted, as at 44, to the spigot body 45 at the other end. A second passage 46 in the spigot block 42 preferably connects the vent pipe 43 to the atmosphere, as via a passage 47, when the block 42 is in position to drain brewed coffee through the spout 20. When coffee is not being drained, the venting system (that is, passage 43) is closed off, as will be clear.

Within the housing 12 the hot-water heating system may be generally similar to that which has been described in my Patent 2,210,126, issued August 15, 1940. Such a heating system preferably includes a boiler 13 having a plurality of heating tubes 48 for the efficient transfer of the heat provided by a gas burner 49. A solenoid-operated valve 50 may control the operation of gas burner 49, and a pilot 51 may assume normal automatic gas-burner operation upon operation of solenoid valve 50. A riser tube 52 is shown to connect the flexible hose 29 to the inside of boiler 13, and the bottom end of the riser pipe 52 is preferably spaced from the bottom of boiler 13 by an amount which will assure a water safety level 53 in the boiler 13. As in the case of my aforementioned patent, reducing valve means 55 may be included in the water-supply line as a means for automatically metering the supply of water to tank 14 in accordance with the selected manual adjustment of the valve 55.

The measuring tank 14 is preferably positioned above the boiler 13, and a three-way valve 54 is of the three position variety, to be operated by two solenoids 56—57. When neither of the solenoids 56—57 is energized, opposed compression springs 58 serve to position the valve 54 centrally, so as to block off all inlet and outlet passages. When solenoid 57 is energized, the tank 14 is connected to dump water into boiler 13, and when solenoid 56 is energized supply water is connected to the tank 14, as will be clear.

In order to control the brewing of coffee in the described apparatus, I employ timing means operated by an electric motor 59, which may be a clock motor. The motor 59 preferably provides a relatively slow drive to a shaft 60, as through reduction gearing 61, and, in the form shown, the drive shaft 60 is connected to one side of a one-way-engaging clutch 62. On the other side of the one-way clutch 62, timing cam means 63—64—65 are ganged to coordinate the operation of cam-follower switch means 66—67—68. A hand set or manual control knob 69 is attached to the front end of the camshaft.

In the relationship shown in Fig. 5, none of the switches 66—67—68 is operated, and the apparatus is, therefore, shut down. It will be understood, however, that from a previous cycle of operation, the measuring tank 14 has been filled with a proper supply of water, depending upon the number of cups of coffee which the machine is to brew in one brewing cycle. The brewing cycle is initiated by a slight counterclockwise manual rotation of the knob 69, and such slight rotation will be understood to raise the cam follower 70 of switch means 67, so as to close the motor circuit and to commence electric drive of the camshaft. The cam 64 is high substantially all the way around, with the exception of a dip 71 which serves to shut off the motor 59 upon completion of a brewing cycle.

Concurrently with operation of switch means 67, cam 63 may be effective to raise the cam follower 72 for closing switch means 66. In the form shown, one of the switches of switch means 66 is connected to operate solenoid 57 and thus to dump measured water from tank 14 into the boiler 13. At the same time, the other switch of switch means 66 may be effective to operate the valve 50 in the gas main, so as to turn on the supply of gas for the burner 49. The heating efficiency of burner 49 for the boiler 13 is preferably relatively high, so that a satisfactorily elevated temperature may be attained in a short period of time. As the temperature in boiler 13 increases, so does the pressure, until this pressure is sufficient to expel hot water in the line 29 to the spray head 28 over the ground-coffee receptacle 10. In order to prevent premature discharge of hot water or, stated in other words, in order better to control the temperature at which hot water will be passed to the spray head 28, I provide bleed means 75 in the riser pipe 52, preferably well above any liquid level anticipated for the boiler 13. It will be appreciated that the bleed means 75 may serve to dissipate any choking effects, and to assure that water will rise in the tube 52 for conduct to the spray head 28 only upon attainment of the desired hot-water temperature, which is preferably less than boiling temperature.

It is not critical how long the switch means 66 remains operative, as long as the tank 14 may fully drain, and as long as the hot water is allowed rise in the tube 29. After the hot water has forced itself out of the boiler 13, the heater 49 may continue to heat the remaining safety water until higher temperatures are reached, and I employ a thermostatic switch 76 in the boiler 13 to deenergize the solenoid of valve 59 upon attainment of a temperature in boiler 13 slightly in excess of that which is required to expel the brewing water from boiler 13.

Once coffee has been sprayed into the ground-coffee receptacle 10, the coffee grounds will be stirred up and suspended in a brewing mixture within the receptacle 10. This brewing may be allowed to proceed (at a temperature preferably less than that of boiling water) for a relatively extended period of time, say a minute and a half. The brewing cycle may then be completed upon operation of switch means 68, as its cam follower 77 rides upon the high points of cam 65. One of the switches of switch means 68 is shown connected to operate a motor 78 for a vacuum pump 79, and the pump 79 is connected, as by a pipe 80, to the cap 17 at the top of the brewed-coffee receptacle 11. It will be clear that the function of pump 79 is to impress a pressure differential across the filter 23 and the coffee grounds, so as to enforce drainage of brewed coffee into the brewed-coffee receptacle 11. Concurrently with the operation of the vacuum pump 79, the other switch of switch means 68 may be connected to operate solenoid 56 so that a fresh supply of metered water may fill the tank 14. By this time the low point on cam 64 may have advanced to drop the cam follower 70 and thus to shut off the motor 59.

It will be clear that I have described a relatively simple completely automatic coffee-maker that may eliminate guesswork, and hence the human element, as a cause of inconsistent brewing. If the brewed-coffee receptacle is relatively large, the arrangement is such that a number of successively brewed batches of coffee may be accumulated in the receptacle 11, without requiring removal of the ground-coffee receptacle. Coffee may thus be made in quantity just before an anticipated rush-hour demand, and further coffee may be prepared even while cups are served at the spigot 19. Of course, the spigot should not be operated while the vacuum process is going on, but this is a matter of relatively short time and a warning light 81 in the circuit of motor 78 and on the front of the housing 12 may help prevent inadvertent spigot operation at such time. If desired, unconsumed brewed coffee may be kept hot and in best serving condition, as by means of an electric hot-plate element 82 as regulated by thermostat switch means having an element 83 projecting into the receptacle 11.

Although I have described a particular automatic coffee-brewing cycle, it will be clear that certain changes in timing may be made as desired. For example, if it should be preferred to have the boiler 13 full (with a measured supply of water) as soon as valve 50 is operated to apply heat, then the dumping of water from measuring tank 14 to boiler 13 could take place while vacuum pump 79 is forcibly straining the brewed coffee. In such event, the electric connections to solenoid 56 need only be interchanged with those for solenoid 57; cam 63 would then operate solenoid 56 to fill tank 14 while heat is supplied to boiler 13, and cam 65 would operate solenoid 57 to dump the measured water into boiler 13 while the vacuum pump 79 is being driven, as will be clear.

While I have described my invention in detail for the preferred form shown, it will be understood that modifications may be made within the scope of the invention as defined in the claims which follow.

I claim:

1. In a brewing device of the character indicated, a brewing chamber, a brewed-beverage chamber, a water heater separate from said chambers and including a vessel and heating means therefor, said heating means including a control element therefor, a discharge connection from said vessel to said brewing chamber, the discharge capacity of said vessel being no greater than the capacity of said brewing chamber, a replacement-water measuring tank including valve means with connections to said measuring tank and to said vessel and to replacement-water supply means; said valve means in a first relationship connecting said measuring tank to said vessel, said valve means in a second relationship connecting said measuring tank for the supply of replacement water thereto, and said valve means in a third relationship effectively cutting off both said connections; first solenoid-controlled actuating means in actuating relation with said valve means for actuating said valve means between said first and third relationships, second solenoid-controlled actuating means in actuating relation with said valve means for actuating said valve means between said second and third relationships, said first solenoid-controlled actuating means being electrically actuable from a first position to a second position and means for moving the same back to said first position, said second solenoid-controlled actuating means being similarly actuable from and to first and second positions thereof, said first solenoid-controlled actuating means in said first position thereof actuating said control element for admitting heat to said vessel and actuating said valve means to admit water from said measuring tank to said vessel, said first solenoid-controlled actuating means in said second position thereof actuating said control element for controlling the shut-off of heat to said heating means and actuating said valve means to shut off the water supply to said vessel; and electric-timer switch means connected to operate said first solenoid-controlled actuating means in a predetermined cyclical sequence and to operate said second solenoid-controlled actuating means in another sequence having the same cyclic period as said first sequence.

2. A brewing device according to claim 1, and including vacuum-inducing means connected to said brewed-beverage chamber, and solenoid-controlled actuating means for said vacuum-inducing means, said last-mentioned solenoid-controlled actuating means being connected for controlled operation by said timer-switch means and in a sequence involving admission of heat to said water heater prior to operation of said vacuum-inducing means.

3. A brewing device according to claim 2, in which said sequence involves the complete admission of heat to said heater prior to operation of said vacuum-inducing means.

4. A brewing device according to claim 2, in which said sequence involves the complete admission of heat to said heater a substantial time interval prior to operation of said vacuum-inducing means.

5. In a brewing device of the character indicated, a brewing chamber, a brewed-beverage chamber, a water heater separate from said chambers and including a vessel and heating means therefor, said heating means including a control element therefor, a discharge connection from said vessel to said brewing chamber, the discharge capacity of said vessel being no greater than the capacity of said brewing chamber, a replacement-water measuring tank including valve means with connections to said measuring tank and to said vessel and to replacement-water supply means; said valve means in a first relationship connecting said measuring tank to said vessel, said valve means in a second relationship connecting said measuring tank for the supply of replacement water thereto, and said valve means in a third relationship effectively cutting off both said connections; first solenoid-controlled actuating means in actuating relation with said valve means for actuating said valve means between said first and third relationships, second solenoid-controlled actuating means in actuating relation with said valve means for actuating said valve means between said second and third relationships, said first solenoid-controlled actuating means in said first position thereof actuating said control element for admitting heat to said vessel and actuating said valve means to shut off the water supply to said vessel, said first solenoid-controlled actuating means in said second position thereof actuating said control element for controlling the shut-off of heat to said heating means and actuating said valve means to admit water from said measuring tank to said vessel; and electric-timer switch means connected to operate said first solenoid-controlled actuating means in a predetermined cyclical sequence and to operate said second solenoid-controlled actuating means in another sequence having the same cyclic period as said first sequence.

CONRAD J. FORSCHNER.

References Cited in the file of this patent

UNITED STATES PATENTS

| Number | Name | Date |
|---|---|---|
| 665,962 | Grace | Jan. 15, 1901 |
| 702,122 | Ziegler | June 10, 1902 |
| 748,910 | Acker | Jan. 5, 1904 |
| 1,376,287 | Meyforth | Apr. 26, 1921 |
| 1,508,809 | White | Sept. 16, 1924 |
| 1,774,980 | Lambert | Sept. 2, 1930 |
| 1,830,000 | Miller et al. | Nov. 3, 1931 |
| 1,929,231 | Yirava | Oct. 3, 1933 |
| 1,952,915 | Evleth | Mar. 27, 1934 |
| 2,014,325 | Grilli | Sept. 10, 1935 |
| 2,149,270 | Burgess | Mar. 7, 1939 |
| 2,210,126 | Risien et al. | Aug. 6, 1940 |
| 2,272,237 | Brown et al. | Feb. 10, 1942 |
| 2,396,527 | Osborne | Mar. 12, 1946 |
| 2,405,751 | McMenamin | Aug. 13, 1946 |
| 2,544,836 | Hotvedt | Mar. 13, 1951 |

FOREIGN PATENTS

| Number | Country | Date |
|---|---|---|
| 230,090 | Great Britain | Feb. 27, 1925 |
| 261,573 | Italy | Dec. 3, 1928 |